INVENTOR.
ARTHUR G. AHLSTONE
By Bernard Kriegel
ATTORNEY.

May 23, 1967  A. G. AHLSTONE  3,321,217
COUPLING APPARATUS FOR WELL HEADS AND THE LIKE
Filed Aug. 2, 1965  4 Sheets-Sheet 3
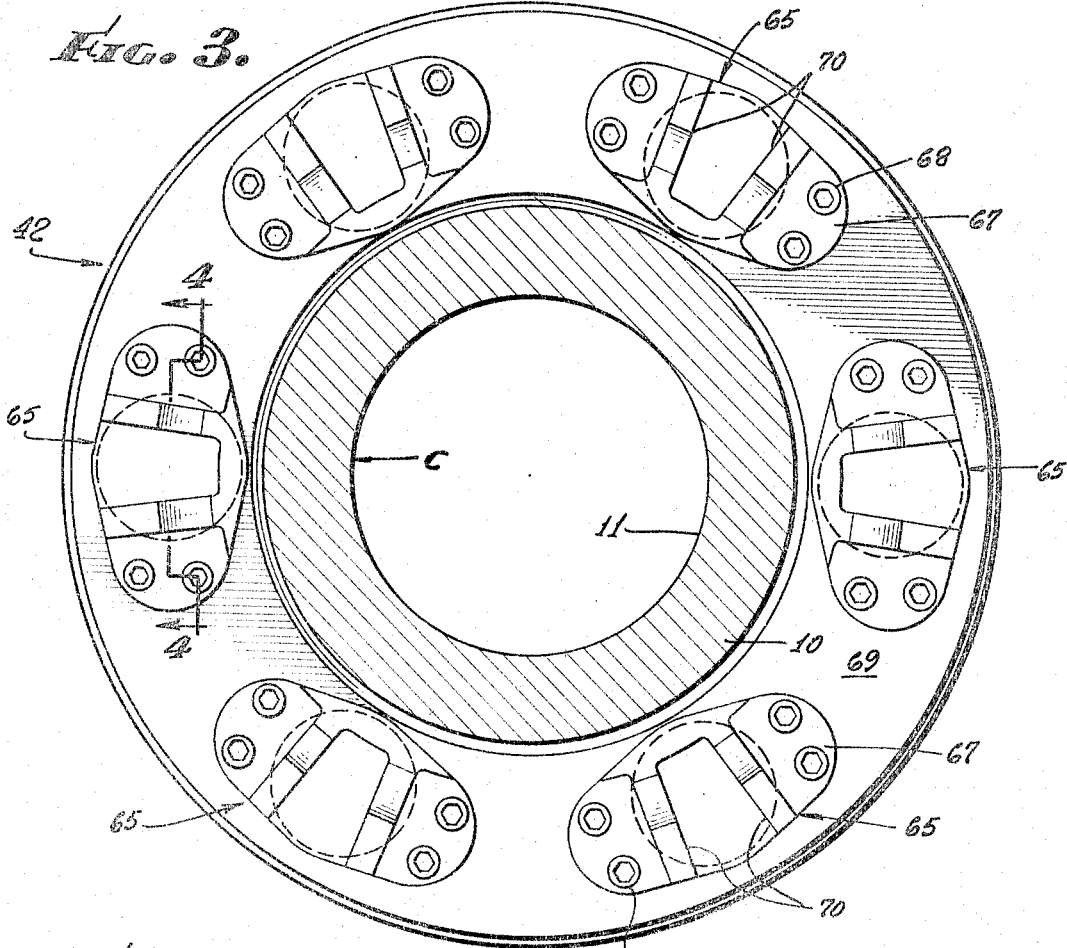
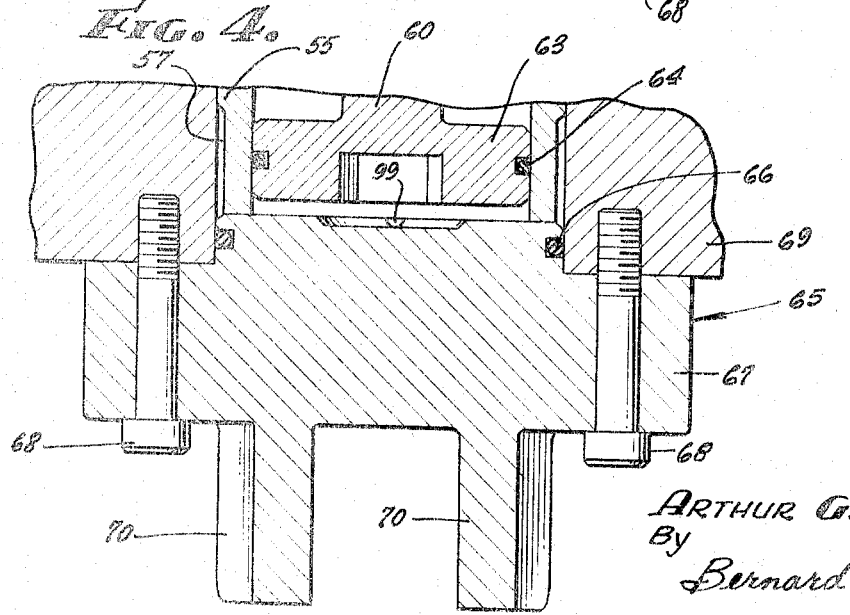
INVENTOR.
ARTHUR G. AHLSTONE
By Bernard Kriegel
ATTORNEY.

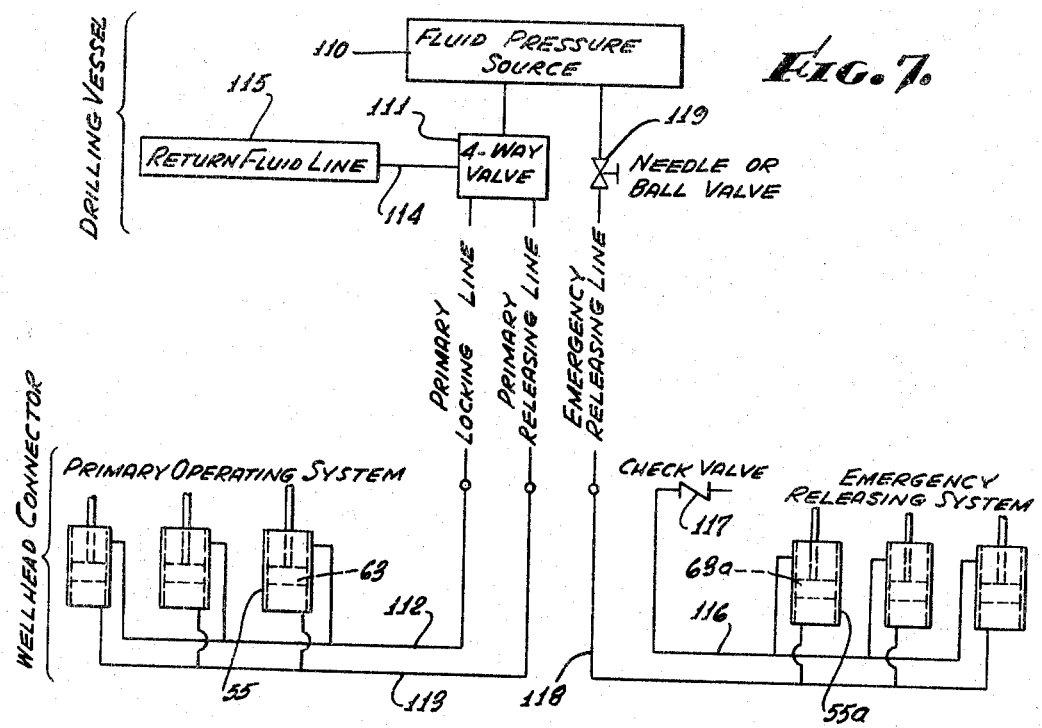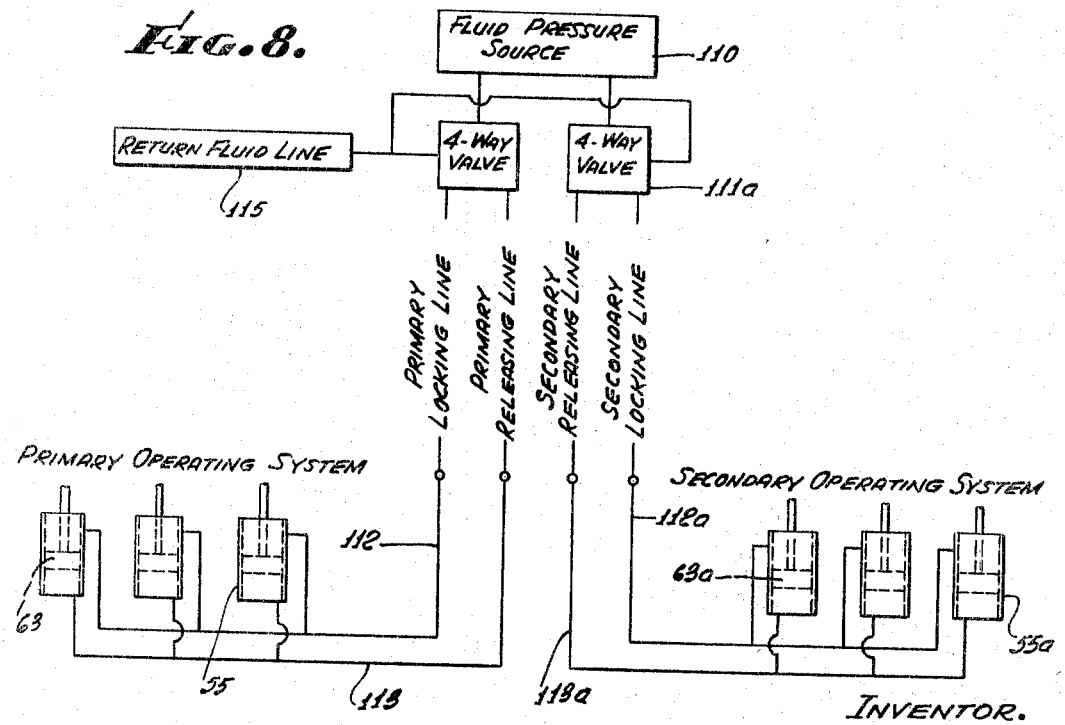

United States Patent Office 3,321,217
Patented May 23, 1967

3,321,217
COUPLING APPARATUS FOR WELL HEADS AND THE LIKE
Arthur G. Ahlstone, Ventura, Calif., assignor to Ventura Tool Company, Ventura, Calif., a corporation of California
Filed Aug. 2, 1965, Ser. No. 476,417
4 Claims. (Cl. 285—18)

The present invention relates to well equipment, and more particularly to connector or coupling apparatus for releasably securing various well components to one another, as at the location of the well head.

In the drilling of oil, gas, and similar wells at an underwater location, a coupling is required for connecting various components together in pressure-sealed relation. Such couplings may be controlled remotely from the drilling rig above the water or by a diver at the coupling site. Conditions vary with different wells, which require differing coupling sizes and pressure ratings. The satisfaction of these differing requirements has resulted in a well operator accumulating and maintaining a relatively large inventory of different size and pressure-rated coupling devices, some of which may not be used, but substantially all of which are expensive. A manufacturer of the coupling devices also has the problem of maintaining an inventory of parts for the benefit of the well operator, and of designing and building the necessary tooling for the various sizes and pressure ratings for which there might or might not be a request. This is obviously a very uneconomical situation facing both the well operator and the manufacturer or supplier of the equipment.

Accordingly, it is an object of the present invention to provide a coupling apparatus, as an apparatus for connecting a blowout preventer to a well head, that is readily adapted or converted for use with different sizes and working pressures of well equipment.

Another object of the invention is to provide a coupling apparatus, and more specifically an apparatus for connecting a blowout preventer to a well head, capable of being placed in a coupled or connected condition by the application of fluid pressure thereto, and which will remain in coupled condition without fluid pressure being maintained thereon.

A further object of the invention is to provide a coupling apparatus, as an apparatus for connecting a blowout preventer to a well head, capable of being placed in both a coupled and an uncoupled condition by the application of fluid pressure thereto, and in which a greater area is available for the fluid pressure to act upon in uncoupling the apparatus than in effecting its coupling, thereby insuring release of the apparatus, when desired, without the need for resorting to relatively high fluid pressures. An additional object of the invention is to provide a coupling apparatus, as an apparatus for connecting a blowout preventer to an underwater well head, which is capable of being lowered through the water to the well head, or other device, and placed in appropriate relation thereto to permit fluid pressure coupling of the apparatus to the well head, or other device, and subsequent uncoupling therefrom when desired, the fluid pressure being derived from a suitable source on a drilling vessel, or the like, located above the well bore.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 3 is a section taken along the line 3—3 on FIG. 2;

FIG. 4 is an enlarged section taken along the line 4—4 on FIG. 3;

FIG. 5 is a partial sectional view corresponding to FIG. 2 illustrating the adaptation of the coupling apparatus for use with various sizes of well heads;

FIG. 7 is a diagrammatic view of a fluid pressure system for placing the coupling or connector apparatus in coupled and uncoupled condition;

FIG. 8 is a diagrammatic view similar to FIG. 7 illustrating another embodiment of fluid operated system for effecting coupling and uncoupling of the connector device.

Figure 1:
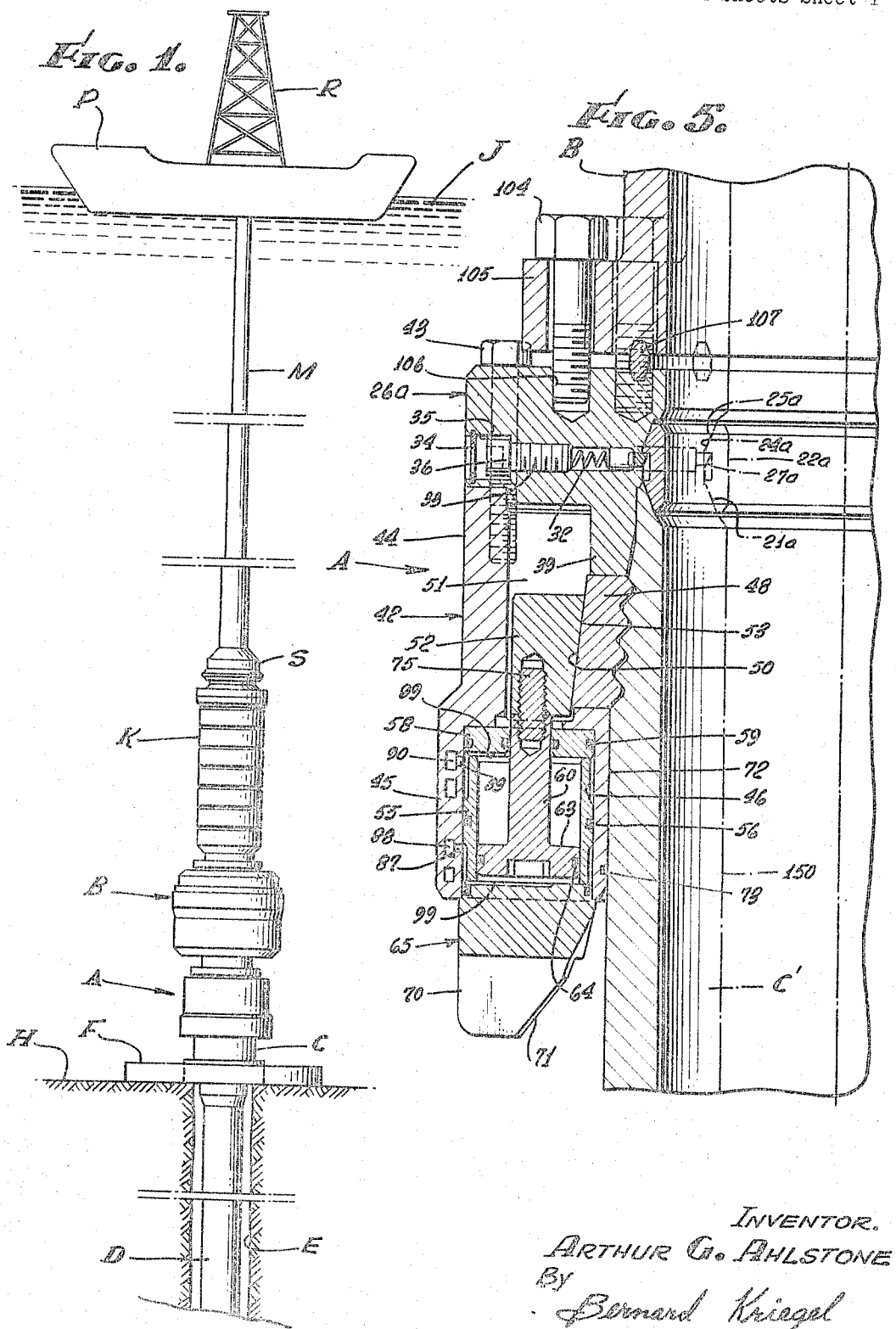
FIGURE 1 is a somewhat diagrammatic view of well bore drilling equipment at an underwater well site, including a hydraulic connector embodying the invention.

The invention is illustrated in the drawings as being applied to a fluid or hydraulically operated connector or coupling apparatus A for connecting a blowout preventer B to a well head C forming the upper portion of a foundation pile D disposed and secured within a well bore E and attached to a suitable pad F resting upon the bottom or floor H of the ocean J. The blowout preventer is secured through a flexible joint K to a string of marine conductor pipe M extending upwardly to a drilling vessel or barge P floating in the ocean J, or other body of water, and which embodies the usual drilling equipment R for drilling the well bore. The hydraulic connector, blowout preventer, flexible joint, and marine conductor pipe are lowered through the body of water so as to effect an attachment of the hydraulic connector A to the well head C in the manner described hereinbelow, either through the aid of a diver, or in the absence of a diver.

As stated above, the tubular foundation pile D of any suitable length is secured within the well bore E, the casing head C extending above the pad F resting upon the bottom H of the ocean. The well head C has an enlarged external diameter 10 and a required internal diamter 11 depending upon the pressures that the well head is to withstand. It is intended that the external diameter 10 be the same for various well heads of different internal diameters in order that essentially the same connector or coupling mechanism A can be attached thereto and placed in suitable sealed relation therewith.

Adjacent to its upper end 12, the well head is provided with a tapered portion 13 along which a plurality of circumferentially continuous grooves 14 are formed or cut providing circumferential ribs 15. Each rib 15 may be of generally V-shape with its upper and lower faces 16, 17 tapering in opposite directions at an angle of about 45 degrees to the axis of the well head. The crest portion 18 of each rib is preferably rounded, which is also true of the bottom 19 of each groove formed by opposite faces 16, 17 of adjacent ribs. The ribs 15 may be of any desired number, but it is preferred that a plurality be used.

The upper end of the upwardly tapering portion 13 of the well head merges into an upper cylindrical portion 20 extending to the upper terminal 12 of the well head, which also has a downwardly tapering internal sealing face 21. A seal ring 22 has a lower external tapered face 23 adapted to mate and seal against the internal sealing surface 21 of the well head, and it also has an upper external tapered face 24 adapted to seal against a companion tapered surface 25 in the upper portion of an adapter 26 forming part of the connector apparatus.

The seal ring 22 is initially retained within the adapter, as during lowering or elevating of the coupling device A toward or from the well head C, by a split, expansible coupling ring 27 disposed within a peripheral central groove 28 in the ring gasket 22, the upper end of the ring 27 engaging the upper side of the groove 28. The ring 27 is also received within an internal groove 29 in the adapter and is prevented from moving out of the external ring groove 28 by a retainer that includes a plurality of circumferentially spaced plungers 30, each of which is disposed within a radial bore 31 in the adapter, the inner end of a helical compression spring 32 within the bore bearing against the plunger 30 and also against a spring seat 33 threaded into the bore and insertable therewithin and removable therefrom from the exterior of the adapter 26 through which the bore extends. A snap retainer ring 34 may be disposed in the counterbore 35 in which the head 36 of the spring seat or screw 33 is received to prevent inadvertent removal of the spring seat from the bore 31.

The adapter 26 has a central passage 37 therethrough conforming to the inside diameter 11 of the particular well head C disposed in the well bore, and it also has a downwardly facing shoulder 38 adjacent to the ring gasket 22 adapted to engage the upper end 12 of the well head. Below the shoulder 38, the adapter includes a depending skirt portion 39 adapted to encompass the upper portion of the well head C, this skirt portion including an upper cylindrical wall 40 conforming to the upper cylindrical periphery 20 of the well head that merges in a downward direction into a tapered internal surface 41 companion to the tapered portion 13 of the well head above its circular ribs or teeth 15.

The adapter 26 is attached to the main body 42 of the coupler A by a plurality of circumferentially spaced cap screws 43, this main body having an upper portion 44 spaced from the skirt portion 39, the upper portion of the main body being integral with a lower portion 45 that has a plurality of circumferentially spaced and longitudinally extending cylinder bores 46. Each cylinder bore terminates at an upper end wall 47 of the body below the skirt 39 of the adapter, the end walls 47 being longitudinally spaced from the lower end of the skirt, and, in the space so provided, a plurality of locking dogs 48 are disposed which have internal ribs or teeth 49 companion to the ribs or teeth 15 on the well head C, and which have externally tapering surfaces 50 that incline to a small degree in a downward and outward direction. The lower portion 45 of the body, its upper portion 44, and the adapter 26 define an annular chamber 51 therebetween in which a wedge ring 52 is disposed. This wedge ring is solid and has an inner tapered surface 53 conforming to the external taper 50 of the locking dogs 48, such that downward movement of the wedge ring 52 within its chamber 51 will shift the dogs inwardly to mesh their teeth or ribs 49 fully with the companion teeth or ribs 15 on the well head. Upward movement of the wedge ring 52 within the annular chamber 51 will allow the dogs 48 to release from the well head C.

The dogs 48 are shifted into locking or connected position with respect to the well head C by fluid or hydraulic pressure, and they may be released therefrom by fluid or hydraulic pressure. Once placed in a locked condition, they will remain in such condition in the absence of fluid or hydraulic pressure acting upon the wedge ring 52.

As specifically disclosed in the drawings, the fluid mechanism for placing the dogs in a locked or unlocked condition includes the cylinder bores 46 disposed below the wedge ring and the locking dogs. In each of these cylinder bores is disposed a cylinder liner 55 sealed against the wall of the bore by a suitable intermediate seal ring 56, the upper and lower portions of each liner having longitudinal grooves 57 therein through which fluid can pass. The upper end of each liner 55 engages a piston rod guide 58 bearing against the upper end wall 47 of the cylinder bore, this guide having an external seal ring 59 for sealing against the wall of the cylinder bore, and also an inner seal ring 61 adapted to seal against a piston rod 60 extending through the guide and through an opening 62 in the end wall. The lower end of the piston rod is integral with a piston 63 slidable along the inner wall of the cylinder liner 55, this piston having a suitable seal or piston ring 64 for preventing leakage between the piston and the cylinder liner.

The lower end of each cylinder bore 46 is closed by a cylinder head 65 piloted within it and having a seal ring 66 for sealing against the wall of the cylinder bore. The cylinder head includes oppositely directed plate portions or flanges 67 extending beyond the cylinder bore through which cap screws 68, or the like, can extend which are threaded into the lower transverse wall 69 of the main body 42, the screws 68 thereby holding the cylinder head 65 against the cylinder liner 55, the cylinder liner against the piston rod guide 58, and the piston rod guide against the inner base 47 of the cylinder bore. Depending from each cylinder head are a plurality, such as a pair, of vertical ribs 70 having downwardly inclined or flared surfaces 71 for the purpose of guiding the main body and adapter assembly A over the upper end of the well head C when lowered with respect thereto in order to place the coupling mechanism in appropriate relation to the well head. The lower portion 45 of the main body has a cylindrical bore 72 adapted to slidably fit the periphery 10 of the well head below its tapered rib portion, there being a suitable seal ring 73 in the lower portion of the main body for sealing against the periphery of the well head and preventing leakage therebetween.

Figure 2:
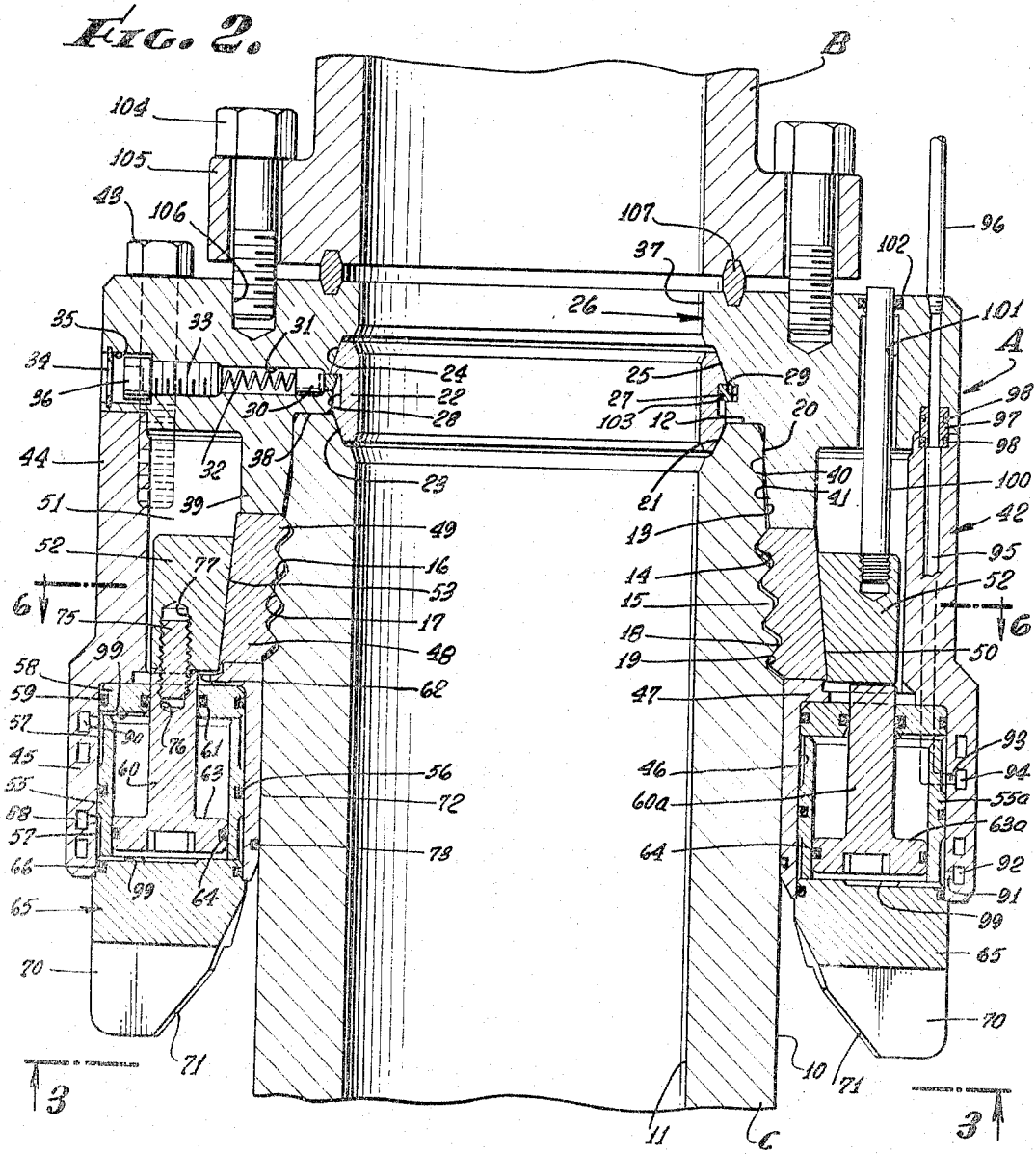
FIG. 2 is a vertical section through the hydraulic connector, disclosed in coupled relation to a well head, parts being shown in side elevation.
Figure 6:
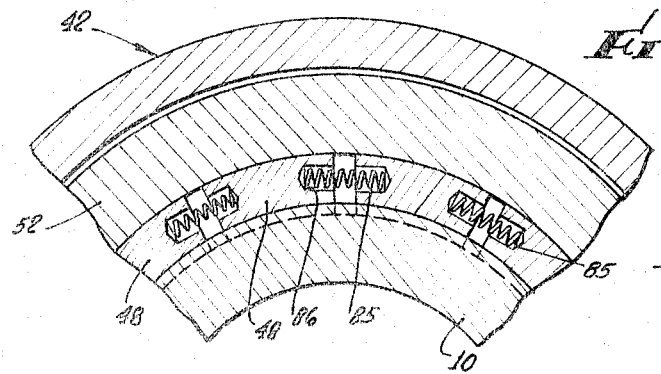
FIG. 6 is a partial section taken along the line 6—6 on FIG. 2.

In the specific form of invention illustrated in FIGS. 1 to 6, inclusive, a plurality of circumferentially spaced cylinders and pistons are provided, only one-half of which are connected to the wedge ring 52 for the purpose of shifting it downwardly within the body and move the locking dogs 48 into coupling engagement with the well head ribs 15. The other cylinders and pistons are used only if additional hydraulic force is necessary to effect release or upward shifting of the wedge ring 52 from wedging relation to the locking dogs 48 when the connector assembly is to be removed from the well head. As specifically illustrated, alternate cylinders 55 and pistons 63 are part of a primary hydraulic system for both shifting the wedge ring 52 downwardly to a dog locking position, and for shifting the wedge ring upwardly to a dog releasing position. The cylinders 55a and pistons 63a therebetween are not connected to the wedge ring 52, but have their piston rods 60a bearing against its lower end for the purpose of forcing it upwardly to a released position position should their use become necessary. Thus, as disclosed at the right side of FIG. 2, the cylinders 55a and pistons 63a, of which there may be three in number in staggered relation with respect to the cylinders 55 and pistons 63 at the left side of FIG. 2, have the upper ends of their piston rods 60a adapted to bear against the lower end of the wedge ring so that the introduction of fluid pressure into the head ends of the cylinders 55a will force the pistons 63a and rod 60a upwardly and urge the wedge ring 52 upwardly.

The pistons 63 and cylinders 55 of the primary hydraulic system are adapted to shift the wedge ring 52 both in an upward and a downward direction. As shown, the piston rods 60 are each connected to the wedge ring 52, as by means of a stud 75 threaded into a bore 76 in the upper end of each piston rod and into a bore 77 opening through the lower portion of the wedge ring. The introduction of fluid pressure into the rod ends of the cylinder liners 55 of the primary hydraulic system will shift the pistons 63 downwardly and will move the wedge ring 52 downwardly, causing it to cam the locking dogs 48 inwardly into locking relation with the well head ribs 15, as disclosed in FIG. 2. On the other hand, the introduction of fluid under pressure into the head end of each cylinder of the primary hydraulic system will shift the piston rods 60 upwardly and will elevate the wedge ring 52 relative to the locking dogs, thereby allowing the locking dogs 48 to expand outwardly from coupling engagement with the well head ribs 15. The auxiliary or emergency releasing system can be used if need be in effecting upward shifting of the wedge ring by introducing fluid under pressure into the head ends of the cylinders 55a, which will shift the pistons 63a upwardly in concert with the pistons 63 of the primary hydraulic system, so that double the force is available for unwedging the ring 52 from its locked relation behind the coupling dogs or elements.

It is to be noted that a greater area in the primary hydraulic system is available for shifting the pistons 63 and the wedge ring 52 to a released position than is available in shifting the pistons 63 downwardly to couple the dogs 48 to the well head ribs 15, such difference in area being presented by the cross-sectional area of each piston rod 60. As an example, the effective area of the piston 63 at the head end of the cylinder 55 can be about 25 percent greater than the effective area at the rod end of the piston 63 for shifting the pistons downwardly. When the emergency or secondary hydraulic system 55a, 63a, 60a is used for aiding in the release of the wedge ring, the total area available for releasing the wedge ring can be about 2½ times as great as the total area available in the primary hydraulic system for shifting the three primary pistons 63 downwardly to a wedge ring locking condition.

Once the wedge ring 52 has been shifted downwardly to its dog locking position, it will remain in that condition since the angle of taper of the surfaces 50, 53 between the wedge ring and the locking dogs is a self-locking angle. As an example, it may be 6½ degrees. With the wedge ring 52 in its upper released position and with the connector apparatus A removed from the well head and elevated thereabove, the locking dogs are expanded outwardly to a greater effective diameter. A helical compression spring 85 is disposed between the confronting ends of each pair of locking dogs 48, each spring being disposed in opposed sockets 86 in the ends of the locking dogs, tending to urge the locking dog segments 48 apart. In a typical case, there may be twelve locking dogs of equal arcuate extent which can make peripheral contact with the casing or well head C of about 340 degrees. Collectively, the springs 85 can shift the dogs away from each other to increase their effective internal diameter to a greater diameter than that of the casing or well head ribs 15.

Each cylinder 55 of the primary hydraulic system has a port 87 communicating with its head end which opens into a circumferential passage 88 in the main body, the piston rod end of each of these cylinders having a port 89 opening into a circumferential passage 90 in the main body 42. Similarly, each cylinder 55a of the secondary or emergency releasing system has a port 91 communicating its head end with a circumferential body passage 92 and port 93 communicating its rod end with a circumferential body passage 94. Each circumferential passage 88, 90, 92, 94 communicates with a separate vertical passage 95 through the main body that extends upwardly through the adapter 26, there being a suitable fluid line 96 connected to the adapter and communicating with each passage therein and extending to the drilling vessel P. Leakage of fluid from each passage is prevented by a bridging sleeve 97 extending across the joint between the adapter and main body and having seal rings 98 sealing against the adapter and main body. Thus, there are four fluid lines 96 running to the drilling barge, each line communicating with one of the four circumferential body passages 88, 90, 92, 94. It is to be noted that fluid communication from each port with the cylinder is along a vertical groove 57 in the cylinder liner and along a radial groove 99 in the piston rod guide 58 or the cylinder head 65 so that the fluid can pass freely between each port and the interior of the cylinder liner 55 or 55a on either the head end of the piston or the rod end of the piston.

An indication of the locked or unlocked condition of the dogs can be obtained as by threadedly or otherwise suitably securing a visual indicator rod 100 to the wedge ring 52 which extends through a longitudinal bore 101 through the adapter, the rod terminating above the adapter. Leakage of fluid along the rod is prevented by a suitable seal ring 102 in the adapter slidably and sealingly engaging the rod. When the wedge ring 52 is in a downward rod-locking position, the rod 100 will be in a lower position. Elevation of the wedge ring 52 to its dog-releasing condition will also elevate the rod higher above the adapter 26, giving an indication that the mechanism is in the released condition.

Initially, the locking dogs 48 are in their expanded condition and will hold the wedge ring 52 and the primary hydraulic pistons 63 in an upper position. The ring gasket 22 can be inserted upwardly into the tapered bore 25 of the adapter, moving past the inner beveled portion 103 of the ring 27. The retainers 30 are then inserted in the radial bores 31, followed by the springs 32 and the threaded spring seats 33 to force the inherently expandable ring 27 into the gasket groove 28 and hold the gasket ring 22 in place. The assembly of mechanism, including the adapter 26, body 42, cylinders and pistons, are then secured to the lower end of the blowout preventer B, as by means of screws or studs 104 extending through a lower flange 105 of the blowout preventer and threaded into bores 106 of the adapter, a gasket 107 being clamped between the blowout preventer and the adapter to prevent leakage therebetween.

The upper portion of the blowout preventer B is suitably secured to the flexible joint K which is attached through a suitable connector S to the lower end of the marine conductor pipe M, by means of which the combination of apparatus is lowered from the drilling vessel P and through the body of water J toward the well head C extending above the pad F. The hydraulic lines 96 have also been connected previously to the apparatus A and are lowered therewith through the body of water. When the coupling apparatus reaches the well head C, the ribs 70 will move over the latter assisted by their tapered guide surfaces 71 engaging the upper end 12 of the well head until the apparatus has been fully stabbed over the well or casing head, the lower portion of the ring gasket 22 bearing against the tapered face 21 of the well head and the locking dogs 48 confronting the circular casing head ribs 15.

The hydraulic system can now be actuated to conduct the hydraulic fluid into the rod ends of the primary hydraulic system cylinders 55. As disclosed diagrammatically in FIG. 7, fluid under pressure from a source 110 on the drilling vessel is pumped through a four-way valve 111 to the primary line 112 leading to the rod ends of the primary cylinders 55, the four-way valve connecting a releasing line 113, running from the head ends of the cylinders 55, to a return line 114 extending to a reservoir 115 or other fluid or liquid source. The application of fluid under sufficient pressure into the rod ends of the primary cylinders 55 shifts the pistons 63 downwardly, which will move the wedge ring 52 downwardly and the locking dogs 48 laterally inwardly to mesh their ribs 49 fully with the ribs 15 on the casing head, thereby securely coupling the apparatus A to the casing head C. The pressure can then be relieved from the primary locking line 112, if desired, since the angle of contact between the wedge ring 52 and the locking dogs 48 is a self-locking angle and the wedge ring will remain in its locked condition. The emergency releasing system 55a, 63a, etc. does not have any fluid conducted to it at this time, since it is only used when the wedge ring is to be shifted upwardly. As disclosed in FIG. 7, the rod ends of the emergency cylinders 55a are connected through a suitable line 116 that contains a check valve 117 that will permit fluid to flow from the rod ends of the cylinders, but which will not permit fluid to return through the line 116 to the cylinders 55a. The head end of each emergency cylinder is connected to a line 118 extending to the fluid pressure source 110, this line being opened and closed by a suitable valve 119.

In the event it is desired to effect a disconnection at the casing head, the four-way valve 111 on the drilling vessel is manipulated in such manner as to connect the primary locking line 112 to the reservoir 115, or other source of fluid, on the drilling vessel, and to connect the pressure releasing line 113 to the fluid pressure source 110. In other words, the rod ends of the cylinders 55 are connected to exhaust and the head ends of the cylinders are connected to the fluid pressure source 110. Accordingly, fluid pressure is introduced into the head ends of the cylinders 55, which will shift the pistons 63 upwardly and move the wedge ring 52 upwardly within the annular chamber 51 to a position allowing the locking dogs 48 to expand outwardly and release from the well head C, such outward expansion being effected by the helical compression springs 85. In the event expansion of the dogs does not occur, the taking of an upward pull on the marine conductor pipe M will cause the tapered faces 17 of the well head ribs to cam the locking dogs 48 outwardly free from engagement with the casing head ribs 15, whereupon the apparatus A can be elevated from the well casing C, the ring gasket 22 being retained in the adapter 26 by the retaining ring 27.

In the event that difficulty is encountered in securing the elevation and release of the wedge ring 52 from the locking dogs, the emergency releasing system can be used as a supplement. The valve 119 is opened so that the fluid pressure from the source 110 will flow through the line 118 into the head ends of the emergency or secondary hydraulic cylinders 55a, the pistons 63a being urged upwardly against the wedge ring and adding to the hydraulic force in the primary hydraulic system to shift the wedge ring upwardly to an uncoupled position with respect to the locking dogs. The fact of locking or release of the wedge ring 52 can be determined visually by observance of the position of the indicator rod 100.

If desired, the secondary auxiliary system 55a, 63a, etc. can also be used for the purpose of shifting the wedge ring 52 downwardly to its locked position. In lieu of their piston rods 60a merely bearing against the lower end of the wedge ring, they would also be connected to the wedge ring, as by means of the studs 75, or the like, that interconnect the piston rods 60 of the primary system with the wedge ring. As disclosed in FIG. 8, the hydraulic control arrangement of the secondary operating system would duplicate that for the primary operating system, in that fluid pressure from the source 110 and to the return fluid line 115 would be under the control of a four-way valve 111a, which is connected to a secondary locking line 112a communicating with the rod ends of the secondary cylinders 55a, and through a secondary releasing line 113a connected to the head ends of the secondary cylinders 55a. By suitably manipulating both four-way valves 111, 111a, the primary and secondary systems can be used simultaneously for downward fluid pressure shifting of all of the pistons 63, 63a and downward forcing of the wedge ring 52 along the locking dogs 48 to force the latter inwardly into full mesh with the well head ribs 15, the coacting tapered surfaces on the dog ribs 49 and the well head ribs 15 insuring a snug downward engagement of the adapter 26 against the upper end of the well head C and of the ring gasket 22 against the sealing tapered face 21 of the well head. When full coupling has been achieved, the fluid pressure in both the primary and secondary operating systems can be relieved.

In the event the wedge ring 52 is to be elevated for the purpose of releasing the lock dogs, both of the four-way valves 111, 111a can be suitably manipulated to connect the rod ends of all of the cylinders to the return fluid line 114, 115 and the head ends to the source of fluid pressure 110, which pressure will then enter such head ends and shift all of the pistons 63, 63a upwardly to elevate the wedge ring 52 with respect to the locking dogs 48 and allow their springs 85 to expand the dogs from the casing head ribs 15. The marine conductor pipe M can then be elevated for the purpose of elevating the connector mechanism A from the well head C, thereby effecting a disconnection therebetween. Again, if the locking dogs 48 have not expanded outwardly from the ribs, the upward force imposed by the marine conductor pipe will cause the upper tapered surfaces of the locking dog ribs to contact the lower tapered surfaces of the casing head ribs, which will cam the locking dogs outwardly to a fully released position.

The major portion of the connector apparatus A can be used in conjunction with different sizes and pressure rated well or casing heads. The external diameter 10 of the head C and its ribs or teeth 15 can be the same, but the internal diameter 11 of the head can change, depending upon the pressures to be encountered in the well bore, and an appropriate sealed relation effected between the connector apparatus and the head with a ring gasket 22 that has substantially the same internal diameter as the internal diameter 11 of the well head. All that is required is to change the adapter 26, ring gasket 22, and snap ring 27 that supports the ring gasket on the adapter. As disclosed in FIG. 5, the main body 42, cylinders and pistons, wedge ring 52, and locking dogs 48, and other elements, will remain the same. Assuming the inside diameter 11 of the well or casing head to have decreased, as indicated in broken lines 150 in FIG. 5, an adapter will be provided that has the same external dimensions as before and the same skirt portion 39, but which may have its threaded holes 106 for reception of the screws or studs 104 that attach it to the blowout preventer B in a different location, as shown in broken lines in FIG. 5. The ring gasket 22a is of smaller diameter adapted to coact with a smaller size tapered sealing face 21a at the upper end of the well head $C^1$, the upper tapered face 24a of the ring gasket being of smaller size to appropriately coact with the companion tapered face 25a of the adapter. The adapter may also receive a smaller diameter gasket 107 for effecting a seal between it and the lower end of the blowout preventer B.

The adapter 26a with the smaller internal dimensions is secured to the main body by the screws 43 and with its ring gasket 22a retained in place by the snap ring 27a, this entire connector combination, including the locking dogs 48, wedge ring 52, and cylinder and piston devices, being lowered by the marine conductor pipe M, flexible joint K, and blowout preventer B from the drilling vessel P through the body of water J to bring the tapered guide surfaces 71 of the ribs 70 over the upper end of the well head, which will allow the connector mechanism to telescope over the well head and the locking dogs 48 to be located in the position in which their ribs 49 can interfit with the ribs 15 of the well head, as determined by engagement of the shoulder 38 on the adapter with the upper end 12 of the well or casing head. At this time, the wedge ring 52 and pistons 63, 63a are in their upper positions. The application of fluid pressure to the rod ends of the cylinders 55, or 55a as well, will shift the pistons 63, or 63a as well, downwardly to force the wedge ring downwardly and shift the locking dogs 48 inwardly into full and firm mesh with the well head ribs 15.

It is, accordingly, apparent that a coupling device has been provided in which it is only necessary to change the size of the removable adapter 26 at its upper portion to make the coupling device usable with different types, sizes and ratings of end connections on the well or casing head, or similar types of devices. Accordingly, only an inventory of different size adapters need be maintained, rather than full and complete couplings and connectors of various sizes.

I claim:

1. In coupling apparatus: an inner device having coupling means thereon; an outer device adapted to be inserted over said inner device; laterally shiftable means on said outer device adapted for coupling to said coupling means, said laterally shiftable means having an external tapered surface; wedge means on said outer device having an inner tapered surface complementary to and engageable with said external tapered surface of said laterally shiftable means for shifting said laterally shiftable means laterally inwardly into coupling relation to said coupling means upon axial movement of said wedge means in one direction along said laterally shiftable means; the angle of said tapered surfaces being self-locking to retain said laterally shiftable means in coupling relation to said coupling means; cylinder means on said outer device having a head end and a rod end; piston means in said cylinder means including piston rod means extending through said rod end and connected to said wedge means and providing an effective area on the rod side of said piston means subject to fluid pressure that is substantially less than the effective area of the cylinder head side of said piston means, means for feeding fluid pressure to the rod end of said cylinder means for moving said piston means and wedge means axially in one direction to shift said laterally shiftable means inwardly to locking position, means for feeding fluid pressure to the head end of said cylinder means for moving said piston means and wedge means axially in the opposite direction to enable said laterally shiftable means to be uncoupled from said inner device, said self-locking angle being so constructed and arranged that a given radial pressure exerted by said complementary surfaces is maintained within limits such that under normal operating limits the same fluid pressure exerted in the head end of said cylinder means as is exerted in the rod end will cause release of said wedge means.

2. In coupling apparatus: an inner device having coupling means thereon; an outer device adapted to be inserted over said inner device; laterally shiftable means on said outer device adapted for coupling to said coupling means, said laterally shiftable means having an external tapered surface; wedge means on said outer device having an inner tapered surface complementary to and engageable with said external tapered surface of said laterally shiftable means for shifting said laterally shiftable means laterally inwardly into coupling relation to said coupling means upon axial movement of said wedge means in one direction along said laterally shiftable means; the angle of said tapered surfaces being self-locking to retain said laterally shiftable means in coupling relation to said coupling means; cylinder means on said outer device having a head end and a rod end; piston means in said cylinder means including piston rod means extending through said rod end and connected to said wedge means and providing an effective area on the rod side of said piston means subject to fluid pressure that is substantially less than the effective area of the cylinder head side of said piston means, means for feeding fluid pressure to the rod end of said cylinder means for moving said piston means and wedge means axially in one direction to shift said laterally shiftable means inwardly to locking position, means for feeding fluid pressure to the head end of said cylinder means for moving said piston means and wedge means axially in the opposite direction to enable said laterally shiftable means to be uncoupled from said inner device, said self-locking angle being so constructed and arranged that a given radial pressure exerted by said complementary surfaces is maintained within limits such that under normal operating limits the same fluid pressure exerted in the head end of said cylinder means as is exerted in the rod end will cause release of said wedge means, supplementary cylinder means on said outer device having a head end and a rod end; supplementary piston means in said supplementary cylinder means including supplementary piston rod means extending through said rod end of said supplementary cylinder means and engageable with said wedge means, means for feeding fluid pressure to the head end of said supplementary cylinder means for moving said wedge means axially in said opposite direction.

3. In coupling apparatus: a well head having a plurality of circumferential external ribs extending along its upper portion; a body structure adapted for movement over said well head, including a lower main body portion and an upper adapter body portion detachably secured to said main body portion; a lock member on said main body portion having inner ribs companion to said external ribs and meshable therewith, said lock member having an external tapered surface; a wedge ring in said main body portion movable axially thereof and having an internal tapered surface complementary to and engaging said external surface; a primary cylinder on said main body portion having a head end and a rod end; primary piston means in said primary cylinder including piston rod means extending through said rod end and connected to said wedge ring and providing an effective area on the rod side of said piston means subject to fluid pressure that is substantially less than the effective area of the cylinder head side of said piston means, means for feeding fluid pressure to the rod end of said cylinder for moving said wedge ring axially in one direction to shift said lock member inwardly to locking position, means for feeding fluid pressure to the head end of said cylinder for moving said wedge ring axially in the opposite direction to enable said lock member to be uncoupled from said well head, the angle of said tapered surfaces being self-locking to retain said lock member ribs meshed with said external ribs, said self-locking angle being so constructed and arranged that a given radial pressure exerted by said complementary surfaces is maintained within limits such that under normal operating limits the same fluid pressure exerted in the head end of said primary cylinder as is exerted in the rod end will cause release of said wedge ring; a supplementary cylinder on said main body portion and having a head end and a rod end; supplementary piston means in said supplementary cylinder including piston rod means extending through said rod end of said supplementary cylinder and engageable with said wedge ring, means for feeding fluid pressure to the head end of said supplementary cylinder for moving said wedge ring axially in said opposite direction.

4. In coupling apparatus: a well head having a plurality of circumferential external ribs extending along its upper portion; a body structure adapted for movement over said well head, including a lower main body portion and an upper adapter head portion detachably secured to said main body portion; a lock member on said main body portion having inner ribs companion to said external ribs and meshable therewith, said lock member having an external tapered surface; a wedge ring in said main body portion movable axially thereof and having an internal tapered surface complementary to and engaging said external surface; a primary cylinder on said main body portion having a head end and a rod end; primary piston means in said primary cylinder including piston rod means extending through said rod end and connected to said wedge ring and providing an effective area on the rod side of said piston means subject to fluid pressure that is substantially less than the effective area of the cylinder head side of said piston means, means for feeding fluid pressure to the rod end of said cylinder for moving said wedge ring axially in one direction to shift said lock member inwardly to locking position, means for feeding fluid pressure to the head end of said cylinder for moving said wedge ring axially in the opposite direction to enable said lock member to be uncoupled from said well head, the angle of said tapered surfaces being self-locking to retain said lock member ribs meshed with said external ribs, said self-locking angle being so constructed and arranged that a given radial pressure exerted by said complementary surfaces is maintained within limits such that under normal operating limits the same fluid pressure exerted in the head end of said primary cylinder as is exerted in the rod end will cause release of said wedge ring; a supplementary cylinder on said main body portion and having a head end and a rod end; supplementary piston means in said supplementary cylinder including piston rod means extending through said rod end of said supplementary cylinder and engageable with said wedge ring, means for feeding fluid pressure to the head end of said supplementary cylinder for moving said wedge ring axially in said opposite direction; and means for selectively conducting fluid under pressure to the head and rod ends of said primary cylinder and secondary cylinder.

References Cited by the Examiner

UNITED STATES PATENTS

| | | | |
|---|---|---|---|
| 1,910,634 | 5/1933 | Pearce | 285—144 |
| 2,109,546 | 3/1938 | McLogan | 24—263.5 |
| 2,897,895 | 8/1959 | Ortloff. | |
| 2,962,096 | 11/1960 | Knox. | |
| 2,970,445 | 2/1961 | Suderow | 24—263.5 |
| 3,052,299 | 9/1962 | Geer. | |
| 3,147,992 | 9/1964 | Haeber. | |
| 3,212,591 | 10/1965 | Tucker | 279—4 |
| 3,222,088 | 12/1965 | Haeber | 285—18 |
| 3,222,089 | 12/1965 | Otteman | 285—18 |
| 3,228,715 | 1/1966 | Neilon | 285—313 |

EDWARD C. ALLEN, *Primary Examiner.*

CARL W. TOMLIN, *Examiner.*

D. W. AROLA, R. GIANGIORGI, *Assistant Examiners.*